United States Patent [19]

Day

[11] 3,857,910

[45] Dec. 31, 1974

[54] OXYGENATOR SUPPORT

[76] Inventor: Lois I. Day, 2280 Whispering Willow Cir., Kettering, Ohio 45440

[22] Filed: Dec. 7, 1972

[21] Appl. No.: 313,095

[52] U.S. Cl. .................. 261/65, 210/199, 210/220, 239/145, 261/122

[51] Int. Cl. .......................... B01f 3/04, C02c 5/04

[58] Field of Search .......... 210/199, 220, 136, 356; 239/145; 261/65, 121 R, 122, 123, 124

[56] References Cited

UNITED STATES PATENTS

| | | | |
|---|---|---|---|
| 1,920,719 | 8/1933 | Stich | 261/122 |
| 2,226,958 | 12/1940 | Zahm et al. | 261/122 X |
| 3,206,178 | 9/1965 | Lamb | 261/122 |
| 3,315,895 | 4/1967 | Klingbeil et al. | 261/122 X |
| 3,432,154 | 3/1969 | Danjes | 261/122 |
| 3,441,216 | 4/1969 | Good | 261/122 X |
| 3,603,509 | 9/1971 | Nechine | 261/122 X |
| 3,626,500 | 12/1971 | Dummann | 261/122 X |
| 3,642,260 | 2/1972 | Danjes et al. | 261/122 |

*Primary Examiner*—Charles N. Hart
*Assistant Examiner*—Robert H. Spitzer
*Attorney, Agent, or Firm*—Eugene C. Goodale

[57] ABSTRACT

An oxygenator support provides a means to hold a flexible porous tube in a horizontal position between the ends thereof. The support is attachable to a source of air wherein air is forced through the tube into the surrounding liquid, such as a sewage tank. The support also includes means to maintain the tube substantially horizontal even under operating conditions. Members on either side of the elongated horizontal tube collect debris in the surrounding liquid medium.

5 Claims, 8 Drawing Figures

OXYGENATOR SUPPORT

BACKGROUND OF THE INVENTION

This invention relates generally to aerators and more particularly to an oxygenator support to provide oxygenation or aeration of sewage.

Sewage, the liquid waste of a community, consists primarily of water and contains generally less than 0.1% of solid matter. In appearance, sewage is turbid and resembles the water coming from the bath or laundry. It usually carries a certain amount of floating materials such as matches, paper, sticks, and feces. Fresh sewage has only a slight odor, but when stale it becomes septic and a strong hydrogen sulphide odor is present. About one third of the solid matter in sewage is in suspension while two thirds are in solution. It is about half organic and inorganic. This organic matter consists of nitrogenous materials, carbohydrates, fats and mineral oils. It is unstable and decomposes with the production of unpleasant odors, and it is this characteristic of sewage which is largely responsible for making sewage treatment necessary. Another important factor is the high bacterial content of the sewage and the presence of pathogenic organism such as those producing intestinal diseases.

If the sewage is to be discharged into a stream which is used as a source of water supply, these pathogenic bacteria will be a public health menace.

The discharge of raw sewage into a stream causes discoloration and turbidity due to the suspended solids and may produce "sleek" on the surface through the presence of oil and grease. Sludge deposits on the stream bottom gradually block the stream channel, and the requirement for oxygen to assist in its decomposition may seriously deplete the oxygen content of the water in the stream.

Perhaps the most important chemical component of sewage is its oxygen content. In the decomposition of the unstable matter in sewage, oxidation plays a very important part. There is oxygen in solution in the water which forms the major part of the sewage, and this oxygen is used up in the process of biochemical decomposition. The amount of oxygen present at any moment in the sewage or in the stream into which the sewage is discharged determines the presence or absence of objectionable conditions which usually accompany the stabilization of sewage and sewage-laden waters. The oxygen content of sewage is rapidly used up by the demand arising from biochemical oxidation processes which are in progress. The amount of oxygen required to stabilize the oxidizable matter present is called the biochemical oxygen demand and is usually referred to as the B.O.D.

It is evident that bacteria play an important part in the decomposition of sewage. If a sewage sample is sterilized, its chemical decomposition is checked. The pathogenic bacteria usually present in sewage include the causal organisms for intestinal diseases. These bacteria must be eliminated before the final disposal of the sewage. However, most of the bacteria in sewage are useful. One group, the anaerobic bacteria, thrive where atmospheric oxygen is excluded and perform important functions in the reduction and digestion of sewage sludge. Aerobic bacteria, on the other hand, require atmospheric oxygen and are responsible for the nitrification and oxidation processes used in the treatment of sewage. Bacteria are responsible for the necessity of sewage treatment through the decomposition processes which they cause, and the engineer uses bacteria in the treatment of sewage by encouraging and controlling their activities so as to produce the desired results.

One of the steps of sewage treatment is oxidation which is the breaking down of the organic solids into stable organic or mineral compounds through biological activity in the presence of oxygen. Direct oxidation of sewage by artificial aeration is too slow for practical use except where conditions favorable to the growth of aerobic bacteria have been provided for the oxidation process. The oxidation process is normally free from the unpleasant odors which accompany anaerobic processes.

The oldest oxidation process in use is irrigation. In the attempt to use higher rates of treatment than are possible in irrigation and to reduce the area necessary, intermittent sand filters were developed, followed later by contact beds and trickling filters. More recently, the activated-sludge method of sewage disposal has replaced the older and less efficient methods to some extent.

The activated-sludge process is a process of oxidizing sewage solids by aeration in the presence of sludge which has been previously oxidized or activated and in which a luxuriant growth of aerobic bacteria has developed. These bacteria are instrumental in bringing about the oxidation process, while aeration furnishes the needed oxygen and also produces adequate agitation for circulating the sludge through the sewage and preventing its settling out and becoming deoxygenated. The process is similar in principle to filtration except that, instead of the sewage being passed through the filter, the filtering medium, which in this case is the sludge with its bacterial population, is circulated through the sewage and comes into intimate contact with it. The adsorption of colloids by the flocculated sludge and oxidation by the aerobic bacteria are similar to but more efficient than those taking place in filters, but the agitation produced by the air performs the further function of coagulating some of the colloids, thus materially assisting the process of sedimentation. It is necessary to supply oxygen continually to the sludge, or its supply will become depleted and anaerobic decomposition will begin. Aeration of sewage without the presence of activated sludge is ineffective. The presence of activated sludge is essential to bring about purification in reasonable periods of time. Since the introduction of air is one of the major items of expense in this process, much experimentation has been carried out in an attempt to reduce the air requirement. In one method, the air enters through porous plates or other types of air diffusers placed across or along the bottom of the long, narrow, aeration tanks. When placed across the tank, a ridge-and-furrow bottom is employed. Where the air is introduced through a longitudinal row of air diffusers, the latter are placed along one side of the tank and cause a transverse spiral, or corkscrew, motion of the sewage through the tank. In addition, mechanical agitation and the introduction of air through the action of paddles have been widely used. In some plants, a saving in power is brought about by a combined use of air diffusers and paddles.

Present day diffusers are of the rigid body type and come in various sizes and shapes. These diffusers produce large bubbles which rise rapidly, do not disperse widely, and entrain less waste matter thereby leaving insufficient oxygen in the liquid. The rapid rising of the large air bubbles produces a great turbulence in the sewage tank which in no way assists in the oxygenation process. While some present day diffusers may produce smaller bubbles, these diffusers are subject to clogging and must be cleaned regularly. In the event of power failure in the air supplying system, the sewage will be forced back through the diffusers causing them to fill up and clog. Clogging of the pores in the diffuser greatly reduces the efficiency of the diffuser and these diffusers must be taken from the system and cleaned using dangerous acids.

Accordingly, it is an object of this invention to provide an oxygenator support which permits the use of a flexible porous air tube.

Another object of this invention is to provide an oxygenator support which will provide small bubbles of air in the surrounding media so as to provide higher dissolved oxygen content therein.

Yet another object of this invention is to provide an oxygenator support having a porous air tube which will collapse in case of air failure thereby preventing reverse flow of the sewage into the air system.

A still further object of this invention is to provide an oxygenator support which will supply a high population density of uniform but properly sized air bubbles to maintain sufficient turbulence or mixing in the sewage medium and at the same time maintain a highly efficient rate of oxygen transfer over a wide range of feed rates.

And yet another object of this invention is to provide an oxygenator support which is self-cleaning and non-clogging even during power failure.

And a still further object of this invention is to provide an oxygenator support which will entrap debris thereon without lessening the density of air bubbles produced.

SUMMARY OF THE INVENTION

This invention provides an improved oxygenator support which permits use of a air tube to provide increased density of dissolved oxygen to be supplied to the surrounding medium, such as a sewage treatment tank or stream or the like. A high porosity air tube is supported by the oxygenator support frame. A support member cooperates with the elongated tube to keep the tube substantially horizontal during air flow therethrough. Debris catching members are mounted on either side of the elongated tube to catch and collect debris.

Other objects, details, uses and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention in which.

DESCRIPTION OF ILLUSTRATED EMBODIMENT

Figure 1:
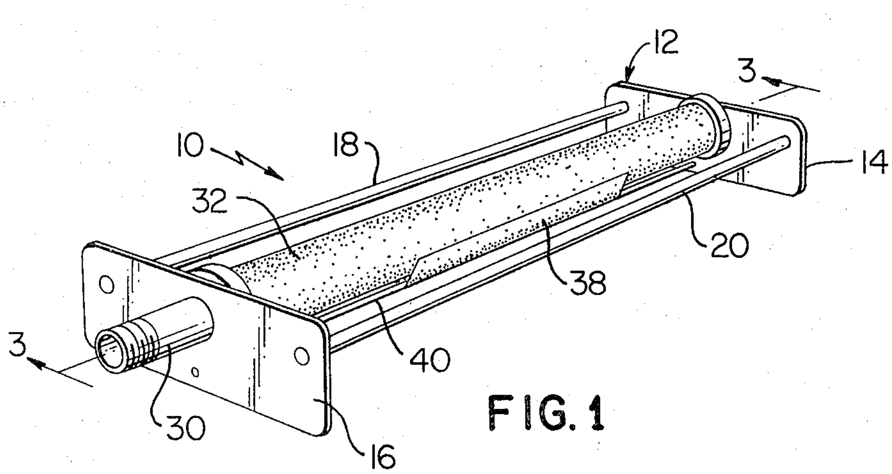
FIG. 1 is a perspective view illustrating one exemplary embodiment of this invention.
Figure 3:
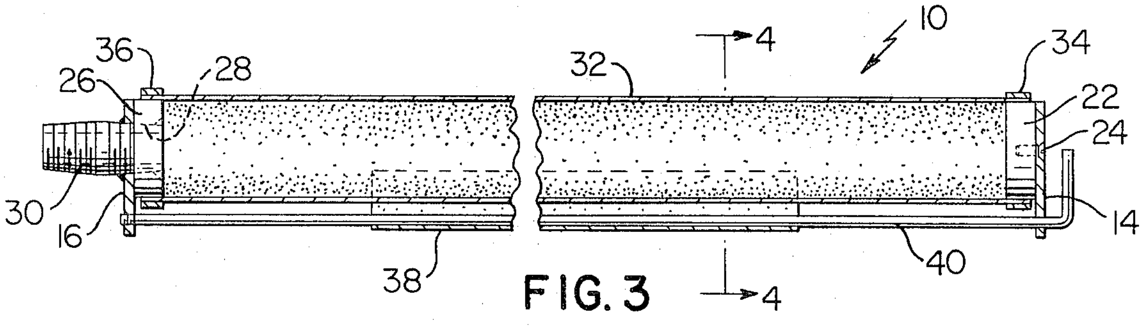
FIG. 3 is a sectional view of the oxygenator support taken along the line 3—3 of FIG. 1.
Figure 4:
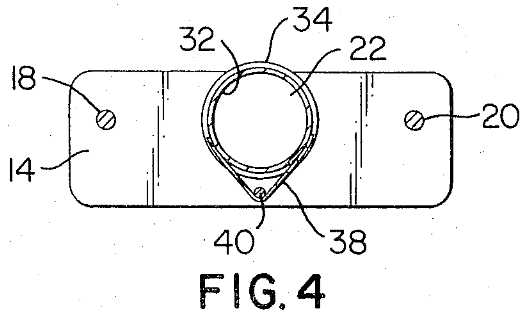
FIG. 4 is a sectional view taken along line 4—4 of FIG. 3.
Figure 5:
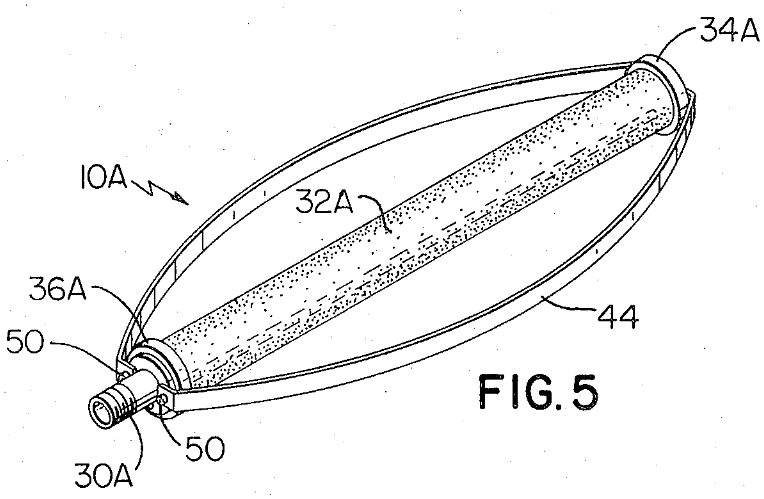
FIG. 5 is a perspective view showing another exemplary embodiment of this invention.
Figure 6:
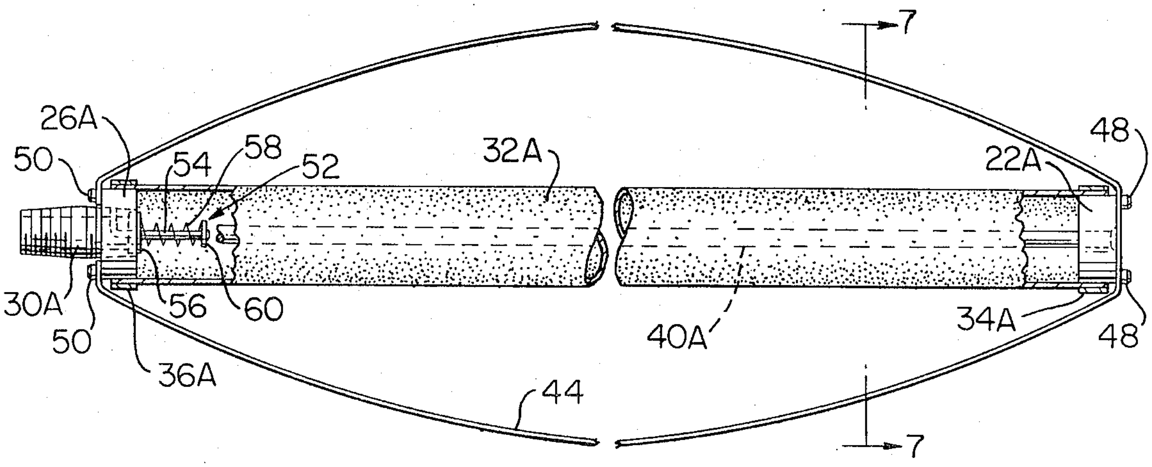
FIG. 6 is a top view, partially broken away, of the oxygenator support illustrated in FIG. 5.

Reference is now made to FIGS. 1, 3 and 4 of the drawings which illustrate one exemplary embodiment of the improved oxygenator support of this invention, which is designated generally by the reference numeral 10. The oxygenator support 10 is seen to be comprised of a frame 12 having a pair of end supports or plates 14 and 16. The end plates 14 and 16 are maintained in axially spaced relation one to the other by spacing members, rods or the like 18 and 20.

Referring now to FIG. 3, a cylindrical member 22 is secured to the end plate 14 by any suitable means such as a screw or the like 24. A similar cylindrical member 26 is secured to the other end plate 16 in a like manner. The cylindrical member 26 is formed with a bore 28 therethrough. A threaded inlet member, such as a threaded pipe or the like, 30 extends through the end plate 16 and into the bore 28 of the cylindrical member 26. The inlet member 30 may be secured to the end plate 16 by any suitable manner such as welding, brazing or the like.

An elongated flexible bubble producing media, such as a high porosity flexible tube 32, is supported between the end plates 14 and 16. The tube 32 is mounted at each end respectively to the cylindrical members 22 and 26 and secured thereon by suitable clamps or the like 34 and 36. It should be noted that any flexible material which will provide a high density of uniform but properly sized air bubbles with air passing therethrough may be utilized. It has been found that a high porosity polyvinyl film of the type described in U.S. Pats. No. 3,375,209 and 3,379,658 provides high efficiency aeration and the disclosure of which is incorporated herein by reference as though set out at length herein. Sheets of the polyvinyl chloride film may be purchased from Clopay Corp., Cincinnati, Ohio, through the marketing agent, Universal Fabric Marketing Corp., Dayton, Ohio.

A tube made from the polyvinyl chloride film is flexible and limp in the absence of air pressure being supplied thereto. When suitable air pressure is supplied through the inlet 30 to the tube 32, the tube will expand and have a tendency to bow upwardly. To insure efficiency of operation, it is necessary to keep the tube 32 in a substantially straight or horizontal position. To accomplish this, a sling 38 (FIGS. 1, 3 and 4) is secured to the lower portion of the tube 32 by any suitable means. A stiffening member or rod 40 extends between the end plates 14 and 16 and passes through the sling 38. It has been further found that 360° air openings are not needed in a tube of the polyvinyl chloride film. Accordingly, optimum aeration can be obtained by only utilizing the upper one-half of the tube 32. The lower onehalf of the tube may be closed by any suitable means such as overlapping of the material or coating the lower half of the tube to prevent air passage therethrough or any similar method.

Figure 2:
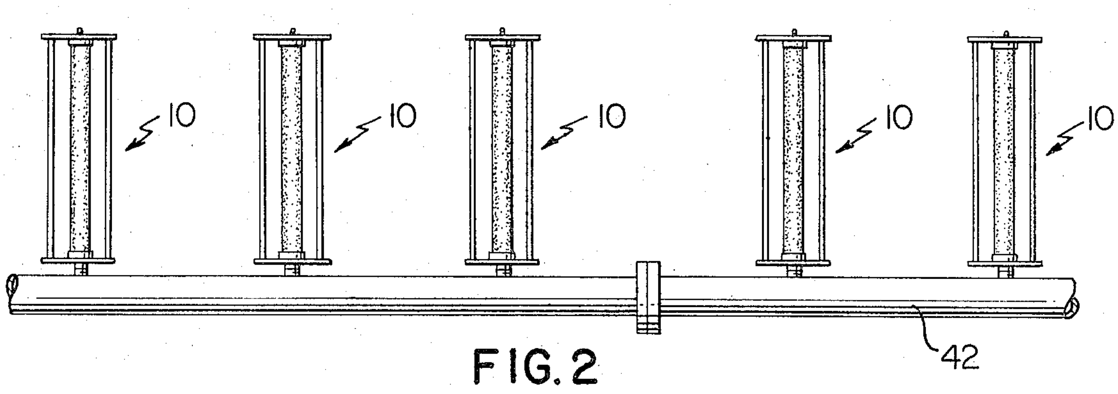
FIG. 2 is a top view showing a partial system incorporating the oxygenator support of FIG. 1.

Referring now to FIG. 2, a typical sewage plant installation using oxygenator supports 10 of the type described hereinabove is shown. Only a fragmentary portion of the system is shown for purposes of explanation. A plurality of the oxygenator supports 10 are threadably mounted to a lateral pipe 42. The lateral pipe 42 is connected to a source of air (not shown). In operation, air is delivered through the pipes 42 to the respective oxygenator supports 10. The air is delivered to the aeration tank through the multiplicity of pores in the flexible tube 32. During the operation, clouds of very small bubbles produced by the tube 32 rise slowly, disperse widely, entrain even the tiniest particles of sewage for far more effective digestion and far higher dissolved oxygen rates. The raising of the air bubbles from the level of the oxygenator supports 10 to the surface of the aerating tank causes a natural circulation of the sewage in the tank. The circulation of the sewage will bring floating debris into close proximity of the oxygenator support 10. Elongated debris such as hair, string and the like become entrapped by the spacing rods 18 and 20 and are thus removed from the sewage tank circulation. Whenever the aeration tank is drained, the debris may be removed from the rods 18 and 20. The polyvinyl chloride tube 32 is selfcleaning and non-clogging. In the event of failure of the air supply, the tube 32 will collapse to a flattened position. The pores of the tube 32 are so tiny that sewage cannot lodge in the pores and the flattening of the tube prevents any liquid sewage from passing back into the lateral pipe 42. If any sewage should dry and cake on the tube 32 during periods of non-operation, such as in the event of air supply failure, the caked sewage will be broken loose from the tube upon restoration of the air pressure to reinflate the tube. In one test, over 200 oxygenator supports of this type were installed in place of ordinary metal diffusers. In the sewage plant, aeration efficiency increased from approximately 12% (all metal diffusers) to over 37% with the oxygenator support described herein. Due to the efficiency of the present device and because less air pressure is required in using the flexible tube oxygenator, the sewage treatment plant only consumed about a third as much electrical energy as those using the present prior art aeration systems.

Figure 7:
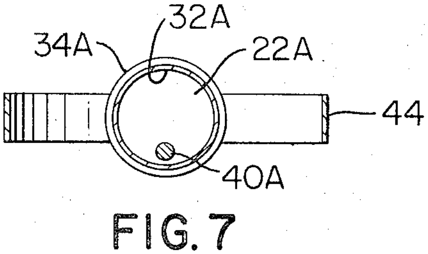
FIG. 7 is a view taken along line 7—7 of FIG. 6.
Figure 8:
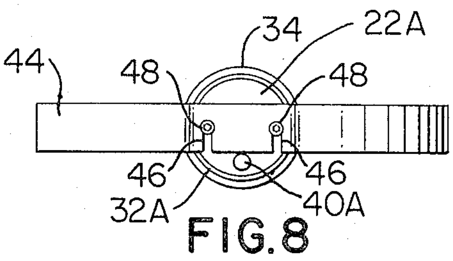
FIG. 8 is an end view of the oxygenator support of FIG. 5.

Another exemplary edmbodiment of this invention is illustrated in FIGS. 5–8 of the drawings. The oxygenator support illustrated in these drawings is very similar to the oxygenator support 10; therefore, such oxygenator support will be designated generally by the reference numeral 10A and parts of the oxygenator support 10A which are very similar to corresponding parts of the oxygenator support 10 will be designated by the same reference numeral as oxygenator support 10 also followed by the letter designation "A" and not described again. In this embodiment, the cylindrical members 22A and 26A also serve the same function as the end plates. The tube 32A is mounted on the cylindrical members 22A and 26A by suitable clamps or the like 34A and 36A. The stiffening member or rod 40A is placed in the interior of the tube 32A. The tube 40A is mounted near the lower periphery of the cylindrical members 22A and 26A (FIG. 7). A steel leaf or the like 44 keeps the cylindrical members 22A and 26A axially spaced apart and also serves as the debris catching arms. As seen in FIG. 8, the leaf 44 is formed with a pair of channels, grooves or the like 46 which cooperatively coact with suitable means, such as screws, bolts, or the like, 48 to secure the leaf 44 to the cylindrical member 22A at one end. The other end of the leaf 44 is secured to the cylindrical member 26A by suitable means such as nuts 50.

Suitable valve means, generally designated as 52, is mounted to the cylindrical member 26A. The valve means 52 comprises a rod 54 having a right angle turn at one end. A valve 56 is slidable mounted on the rod 54 and is seated against a valve seat by spring 58 acting thereon. The other end of spring 58 acts against washer 60 which is secured at the end of the rod 54. When air pressure is supplied through the inlet member 30A, the valve 56 is urged outwardly along the rod 54 to open the valve passage to allow air into the tube 32A. If for some reason the air supply is shut off, the spring 58 will urge the valve 56 into seating engagement with the valve seat to prevent any reverse flow of liquid through the inlet member 30A.

While the oxygenator support hereinabove described has been specifically described and shown for use with a polyvinyl chloride film tubular member, it is to be understood that flexible tubes of any material might be used therefor.

It can be seen that an oxygenator support has been provided which permits the use of a flexible porous tube to provide a high density and uniform distribution of air bubbles so as to maintain a high oxygen transfer. An increase in the feed rate of the air supply only results in an increased bubble population and increases turbulence very little. The oxygenator support collects debris independent of the bubble producing medium and the bubble producing medium is self-cleaning and non-clogging even during power failure. Accordingly, the objectives hereinbefore set forth have been accomplished.

While present exemplary embodiments of this invention have been illustrated and described, it will be recognized that this invention may be otherwise variously embodied and practiced by those skilled in the art.

What is claimed is:

1. An oxygenator support connectable to an air supply to provide a high density of air bubbles comprising:

a pair of end supports;

a flexible cylindrical porous film having a high density of pores extending therethrough mounted in suspended fashion at each end to each respective end support and extending therebetween;

means on one semi-cylindrical portion of said cylindrical film to effectively seal the pores therealong wherein only the pores in the other semi-cylindrical portion of said cylindrical film are unsealed;

inlet means through one of said end supports to provide communication between a source of air and the interior of said cylindrical film, wherein air bubbles are formed as the air passes outwardly through the unsealed portion of said cylindrical film, said unsealed portion being the upper portion when said cylindrical film is in a horizontal position as the air pressure within the cylindrical film builds up and escapes therethrough;

means axially spacing said end supports apart so as to keep said film substantially tight; and a rod extending between said end supports and cooperating with said cylindrical film to maintain said cylindrical film in a substantially horizontal position during air flow therethrough.

2. The oxygenator support as set forth in claim 1 in which said rod is external of said cylindrical film and further comprising a sling secured to the lower portion of said cylindrical film and extending around said rod wherein said rod extends between said sling and said lower portion.

3. The oxygenator support as set forth in claim 1 in which said rod is internal of said cylindrical film.

4. The oxygenator support as set forth in claim 3 in which said axial spacing means is an elongated leaf member exteriorly of said cylindrical film and connected at each end support.

5. The oxygenator support as set forth in claim 1 in which said cylindrical porous film is a polyvinyl chloride film.

* * * * *